(12) United States Patent  
Ramamoorthy

(10) Patent No.: US 9,416,761 B2  
(45) Date of Patent: Aug. 16, 2016

(54) NINE PHASE INDUCTION MOTOR STARTER/ALTERNATOR

(71) Applicant: CATERPILLAR INC., Peoria, IL (US)

(72) Inventor: Krishnakumar Ramamoorthy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 90 days.

(21) Appl. No.: 14/502,028

(22) Filed: Sep. 30, 2014

(65) Prior Publication Data

US 2016/0090959 A1    Mar. 31, 2016

(51) Int. Cl.
| | |
|---|---|
| *H02P 1/42* | (2006.01) |
| *F02N 11/08* | (2006.01) |
| *H02K 17/14* | (2006.01) |
| *H02P 9/02* | (2006.01) |
| *H02P 25/18* | (2006.01) |

(Continued)

(52) U.S. Cl.
CPC .......... *F02N 11/0859* (2013.01); *F02N 11/087* (2013.01); *H02K 3/28* (2013.01); *H02K 17/14* (2013.01); *H02P 9/02* (2013.01); *H02P 25/188* (2013.01); *H02P 25/20* (2013.01); *F02N 2011/0877* (2013.01)

(58) Field of Classification Search
CPC ........... H02P 3/14; H02P 27/04; H02K 17/14; H02K 3/00; H02M 5/45
USPC ......... 318/727, 738, 748, 778, 779, 800, 801, 318/807, 812, 430, 432, 440, 445, 495, 496, 318/503, 504; 310/216.001, 216.051, 160, 310/166, 168, 168 R, 169, 171, 179, 184, 310/208; 363/40, 55, 95, 120
See application file for complete search history.

(56) References Cited

U.S. PATENT DOCUMENTS

| | | | |
|---|---|---|---|
| 1,418,779 A | 6/1922 | Creedy | |
| 4,144,470 A | 3/1979 | Auinger | |
| 5,019,766 A * | 5/1991 | Hsu ......................... | H02K 3/28 310/184 |

(Continued)

FOREIGN PATENT DOCUMENTS

| | | |
|---|---|---|
| EP | 2320551 A1 | 5/2011 |
| JP | 05-316700 A | 11/1993 |

(Continued)

*Primary Examiner* — Antony M Paul  
(74) *Attorney, Agent, or Firm* — Finnegan, Henderson, Farabow, Garrett & Dunner, LLP

(57) ABSTRACT

An electrical induction motor may include nine terminals configured to receive nine current inputs from nine output phases of a nine phase inverter. The motor may include nine windings connected to the nine terminals, and a plurality of contactors, wherein each of the plurality of contactors may be selectively opened or closed in a circuit including the nine windings to selectively connect the windings together in one of a mesh configuration or a star configuration. Each of the windings may be selectively connected between two of the nine current inputs, with a phase angle difference between the two current inputs of 40 degrees. Each of the contactors may be selectively opened or closed to establish a span value for the mesh configuration of two, with two being the number of inverter output phases between a terminal of one of the nine windings and a terminal of another of the nine windings connected to the one of the nine windings. The motor may selectively receive a first one of the harmonics of a drive waveform generated by the nine phase inverter and a second, different one of the harmonics of the drive waveform generated by the nine phase inverter.

20 Claims, 5 Drawing Sheets

9 PHASE MESH CONNECTED SPAN 2 WINDING 5TH HARMONIC CURRENT  
INVERTER VOLTAGE = 1.46 * WINDING VOLTAGE  
INVERTER CURRENT = 0.68 * WINDING CURRENT

9 PHASE MESH CONNECTED SPAN 2 WINDING 1ST HARMONIC CURRENT  
INVERTER VOLTAGE = 0.777 * WINDING VOLTAGE  
INVERTER CURRENT = 1.28 * WINDING CURRENT

(51) Int. Cl.
*H02K 3/28* (2006.01)
*H02P 25/20* (2006.01)

(56) References Cited

U.S. PATENT DOCUMENTS

| | | | |
|---|---|---|---|
| 5,650,707 A | 7/1997 | Lipo et al. | |
| 5,977,679 A | 11/1999 | Miller et al. | |
| 6,456,033 B1 | 9/2002 | Nishimura | |
| 6,710,495 B2 * | 3/2004 | Lipo | H02K 3/28 310/184 |
| 7,905,813 B2 * | 3/2011 | Edelson | B60L 11/04 477/110 |
| 7,928,683 B2 * | 4/2011 | Edelson | H02P 25/22 318/432 |
| 8,258,665 B2 * | 9/2012 | Edelson | H02K 3/12 310/179 |
| 2005/0242758 A1 * | 11/2005 | Edelson | H02K 3/28 318/376 |
| 2010/0219788 A1 | 9/2010 | Edelson | |

FOREIGN PATENT DOCUMENTS

| | | |
|---|---|---|
| JP | 2001-304001 | 10/2001 |
| JP | 2005-6400 | 1/2005 |
| JP | 2010-178580 A | 8/2010 |

\* cited by examiner

NINE PHASE INDUCTION MOTOR STARTER/ALTERNATOR

TECHNICAL FIELD

The present disclosure relates generally to induction motors and, more particularly, to a nine phase induction motor for use as a starter and as an alternator.

BACKGROUND

Machines, such as, for example, track-type tractors and other off-highway vehicles including construction, agriculture, and mining machines, are used to perform many tasks. To effectively perform these tasks, such machines require a power source that provides significant power to a drive system. The power source may be an engine such as, for example, a turbine engine, diesel engine, gasoline engine, or natural gas engine operated to generate a torque output at a range of speeds. This torque is typically provided to one or more traction devices via a transmission operably connected to the engine via the drive system.

To start such machines, a starter motor with the capability of generating a large amount of torque at low speeds is needed. Often the amount of electrical power required to operate a starter motor for a relatively short period of time can significantly drain the available power in a portable energy storage device such as a battery. In order to maintain sufficient power in the battery for multiple starts of the power source, an electrical generator such as an alternator is often provided to generate the electrical power needed to recharge the battery. If an induction motor is used as both a starter motor and as an alternator to generate electrical power, the induction motor must be able to operate at lower speeds and higher torque when starting the machine, and at higher speeds and lower torque while still generating sufficient power in its capacity as an alternator or generator.

An exemplary induction motor used as both a starter and an alternator is described in U.S. Pat. No. 5,977,679 (the '679 patent) issued to Miller et al. on Nov. 2, 1999. The '679 patent describes an induction motor including a stator having a cylindrical core with a plurality of inner and outer slots and a plurality of toroidal coils wound about the core and laid in the inner and outer slots. The design of the induction motor in the '679 patent is said to enable arbitrary combination of the number of poles and phases of the motor, thus allowing for smooth torque operation in the alternator mode.

Although the induction motor disclosed in the '679 patent may provide some advantages in allowing an induction motor to be used in both a starter mode and as an alternator, the motor still experiences a variety of drawbacks. For example, in order for the induction motor in the '679 patent to transition from engine cranking to alternator mode, the number of phases must be changed to accommodate a change in a number of poles. This required change in the number of phases also results in a significant increase in the electronic complexity of an inverter that is connected to the coils of the motor to allow multiphase operation.

The disclosed systems and methods are directed to overcoming one or more of the problems set forth above.

SUMMARY

In an exemplary embodiment of the present disclosure, an electrical induction motor is configured to receive nine separate current inputs at nine separate terminals from nine output phases of a nine phase inverter. The motor further includes nine windings connected to the nine separate terminals, and a plurality of contactors. Each of the plurality of contactors is configured to be selectively opened or closed in a circuit including the nine windings to selectively connect the nine windings together in one of a mesh configuration or a star configuration. Each of the nine windings is configured to be selectively connected between two of the nine separate current inputs, with a phase angle difference between the two separate current inputs of 40 degrees. Each of the plurality of contactors is further configured to be selectively opened or closed to establish a span value for the mesh configuration of two, with two being the number of inverter output phases between a terminal of one of the nine windings and a terminal of another of the nine windings connected to the one of the nine windings. The motor is further configured to selectively receive a first one of the harmonics of a drive waveform generated by the nine phase inverter, and a second, different one of the harmonics of the drive waveform generated by the nine phase inverter.

In another exemplary embodiment of the present disclosure, a method is disclosed for configuring a nine phase electrical induction motor including nine windings and a plurality of contactors arranged in a circuit including the nine windings. The method includes selectively opening or closing each of the plurality of contactors to selectively connect the nine windings together in one of a mesh configuration or a star configuration. The method further includes selectively connecting each of the nine windings between two of nine separate current inputs from nine output phases of a nine phase inverter, with a phase angle difference between the two separate current inputs of 40 degrees. The method still further includes selectively opening or closing each of the plurality of contactors to result in a span value for the mesh configuration of two, with two being the number of inverter output phases between a terminal of one of the nine windings and a terminal of another of the nine windings connected to the one of the nine windings. The method also includes selectively receiving a first one of the harmonics of a drive waveform generated by the nine phase inverter, and a second, different one of the harmonics of the drive waveform generated by the nine phase inverter.

In a further exemplary embodiment of the present disclosure, an electrical system for a machine is disclosed. The electrical system includes a nine phase inverter and a nine phase induction motor configured to receive nine separate current inputs at nine separate terminals from nine output phases of the nine phase inverter. The nine phase induction motor includes nine windings, and a plurality of contactors. Each of the plurality of contactors is configured to be selectively opened or closed in a circuit including the nine windings to selectively connect the nine windings together in one of a mesh configuration or a star configuration. Each of the nine windings is configured to be selectively connected between two of the nine separate current inputs, with a phase angle difference between the two separate current inputs of 40 degrees. Each of the plurality of contactors is further configured to be selectively opened or closed to establish a span value for the mesh configuration of two, with two being the number of inverter output phases between a terminal of one of the nine windings and a terminal of another of the nine windings connected to the one of the nine windings. The motor is further configured to selectively receive a first one of the harmonics of a drive waveform generated by the nine phase inverter, and a second, different one of the harmonics of the drive waveform generated by the nine phase inverter.

DETAILED DESCRIPTION

Figure 1:
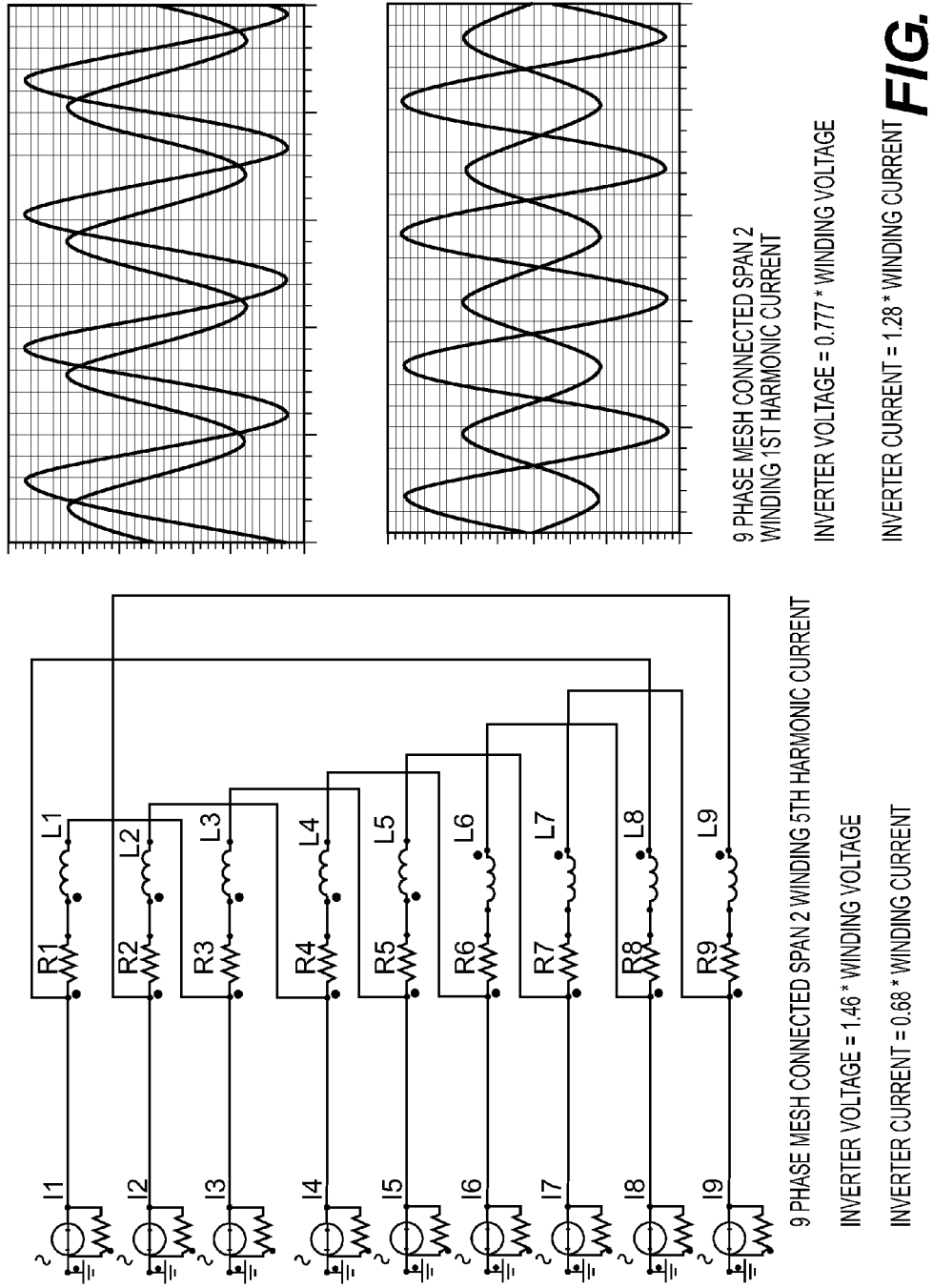
FIG. 1 is an electrical schematic of an exemplary wiring configuration for a nine phase, span 2 electrical induction motor with the windings connected in a mesh configuration and with an exemplary depiction of two harmonic drive waveforms.

FIG. 1 is an electrical schematic of one possible configuration of the electrical connections between the windings in an electrical induction motor adapted for use as both a starter motor and an alternator in a machine. The machine in which the electrical induction motor may be used could include any machine that performs some type of operation associated with an industry such as mining, construction, farming, transportation, or any other industry known in the art.

Windings of the induction motor are shown arranged in what is commonly referred to as a mesh configuration in the circuit diagram of FIG. 1. In the implementation shown in FIG. 1, the windings may be wound on an annular stator (additional features of the stator are left out for clarity) of a nine phase electrical induction motor. A rotor (not shown) may be rotatably mounted within the annular stator. The windings L1-L9 on the stator in the exemplary implementation shown in FIG. 1 are represented by resistances R1-R9 connected in series with inductances. One of ordinary skill in the art will recognize that the representations of resistances and inductances in FIG. 1 are symbolic of exemplary electrical characteristics of the windings L1-L9, and are not meant to be limiting. A nine phase inverter may provide each of nine separate current inputs I1-I9 (each represented symbolically in FIG. 1 by a voltage source connected in parallel with a resistance) to nine separate terminals on the electrical induction motor. The nine phase induction motor may be configured to receive the nine current inputs at the nine terminals from nine output phases of the nine phase inverter. The motor may further include a plurality of switches or contactors (not shown). Each of the plurality of switches or contactors may be configured to be selectively opened or closed in a circuit including the nine windings to selectively connect the nine windings together in one of the mesh configuration (shown in FIG. 1) or a star configuration (shown in FIG. 4). In the mesh configuration of FIG. 1, each of the nine windings may be configured to be selectively connected between two of the nine separate current inputs, with a phase angle difference between the two separate current inputs of 40 degrees. For example, winding L1 is shown as being connected between current input source I1 and current input source I3. Winding L2 is shown as being connected between current input source I2 and current input source I4. The span value for the mesh configuration illustrated in FIG. 1 is two, with two being the number of inverter output phases between a terminal of one of the nine windings and a terminal of another of the nine windings connected to the one of the nine windings.

Figure 4:
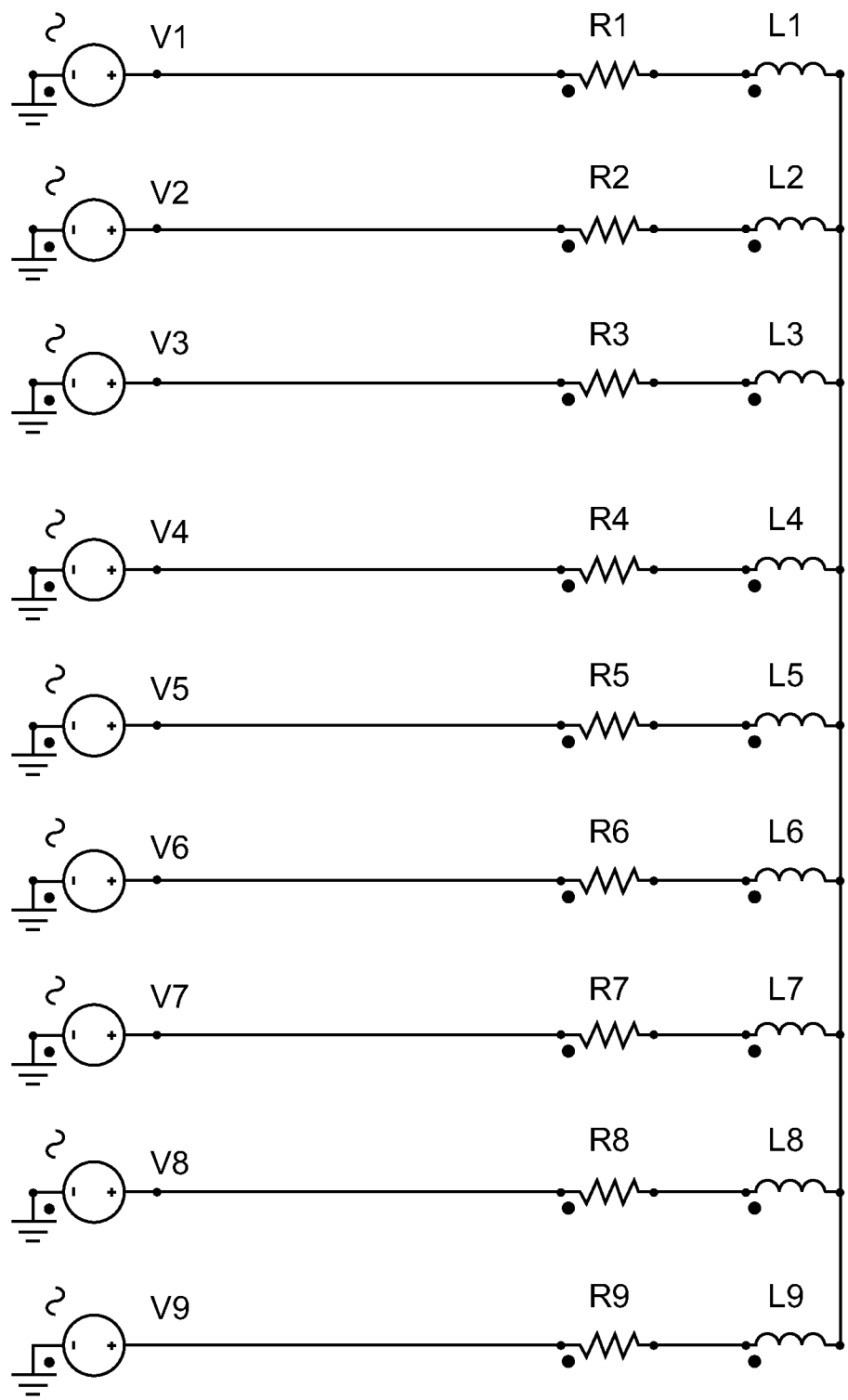
FIG. 4 is an electrical schematic of an exemplary wiring configuration for a nine phase, span 2 electrical induction motor with the windings connected in a star configuration.

In contrast to the nine phase mesh connected configuration of FIG. 1, FIG. 4 illustrates a variation to a nine phase induction motor where the windings are connected in a star configuration. In the nine phase star connected configuration each of the windings L1-L9 is connected at one end to a different terminal configured for receiving a voltage V1-V9 from the nine phase inverter. In the star configuration the opposite end of each of the windings is connected to a neutral point common to all nine of the windings. In contrast to the mesh configuration of FIG. 1, the star configuration of FIG. 4 provides for the same current through all of the windings. The star configuration may therefore allow for a higher current flow through each of the windings since the current does not get split between windings. The mesh configuration may provide for a lower current flow through each winding and a higher voltage across each of the windings.

The right hand side of FIG. 1 illustrates exemplary plots of two different harmonics of a drive waveform that may be applied by a nine phase inverter to each of the nine current inputs I1-I9 shown on the left hand side of FIG. 1. As indicated in the legend on the left hand side of FIG. 1, one exemplary implementation may include selectively receiving a $5^{th}$ harmonic of the drive waveform supplied by the inverter to the current inputs of a nine phase, mesh connected, span two induction motor. The exemplary implementation may also include selectively receiving a first, fundamental harmonic of the drive waveform supplied to the current inputs of the nine phase, mesh connected, span two induction motor. Each of the harmonics of the drive waveform supplied by an inverter is a component frequency of the signal that is an integer multiple of the fundamental frequency of the drive waveform. The number of magnetic poles generated when current flows through the windings changes as the harmonics of the drive waveform are changed. Various alternative implementations may include selectively receiving a first one of the harmonics of the drive waveform for certain desired applications of the induction motor, and a second, different harmonic for other applications. As will be described in more detail below, a first application may include a low speed, high torque application such as operating the induction motor as a starter. A second application may include a high speed, low torque application such as operating the induction motor as an alternator or generator.

In the exemplary implementations referenced in FIG. 1, a first harmonic waveform applied to the windings of a nine phase, mesh connected, span two induction motor will result in two magnetic poles. A fifth harmonic waveform applied to the windings of the same motor will result in the generation of ten magnetic poles. The additional poles are generated as a result of multiplying the number of sine wave peaks produced by the harmonic drive waveform in a first, fundamental harmonic by the number of the harmonic. For example, a fifth harmonic will produce five times as many sine wave peaks over the same period of time as the first or fundamental harmonic will produce. Therefore, the result of driving the induction motor with a higher harmonic is an increase in the number of magnetic poles generated by the flow of current through the windings of the motor. An increase in the number of poles translates into an increase in the torque produced by the induction motor. This is because the amount of torque produced is proportional to the amount of current flowing through the windings. As shown in the legends of FIG. 1, the amount of current flowing through the windings, and therefore the amount of torque generated, increases when the drive waveform is switched from a first harmonic to a fifth harmonic. More specifically, and in one exemplary implementation, the winding current (also synonymous with a phase current) when a first harmonic of the drive waveform is applied to the current inputs of the nine phase motor equals the inverter current divided by 1.28, while the winding current when a fifth harmonic of the drive waveform is applied equals the inverter current divided by 0.68.

The advantage of changing the harmonics of the drive waveform applied by the inverter to the motor, and thereby changing the number of magnetic poles generated by the current flowing through the windings, is that the amount of torque produced by the motor may be changed by electronically changing the drive waveform synthesized by the inverter. This means that physical changes to the motor, such as opening or closing switches or contactors, do not have to be made to effect a desired change in output torque. Similarly, changing the harmonics of the drive waveform applied by the inverter to the motor, and thereby changing the number of magnetic poles, may accommodate increased speed of rotation of the motor and lower torques. The voltage across each of the windings of the motor is proportional to the speed of rotation of the motor. As shown in the legends of FIG. 1, the voltage across each of the windings, and therefore the speed of rotation of the rotor, increases when the drive waveform is switched from a fifth harmonic to a first harmonic. More specifically, the winding voltage (synonymous with phase voltage) when a fifth harmonic of the drive waveform is applied equals the inverter voltage divided by 1.46, while the winding voltage when a first harmonic of the drive waveform is applied equals the inverter voltage divided by 0.777. Furthermore, changes in the harmonics of the drive waveform provided by the inverter may be obtained in a smooth fashion, successively passing through various admixtures of harmonic components. As a result, there are no sudden discontinuities in the drive when switching between harmonic operating states.

Figure 2:
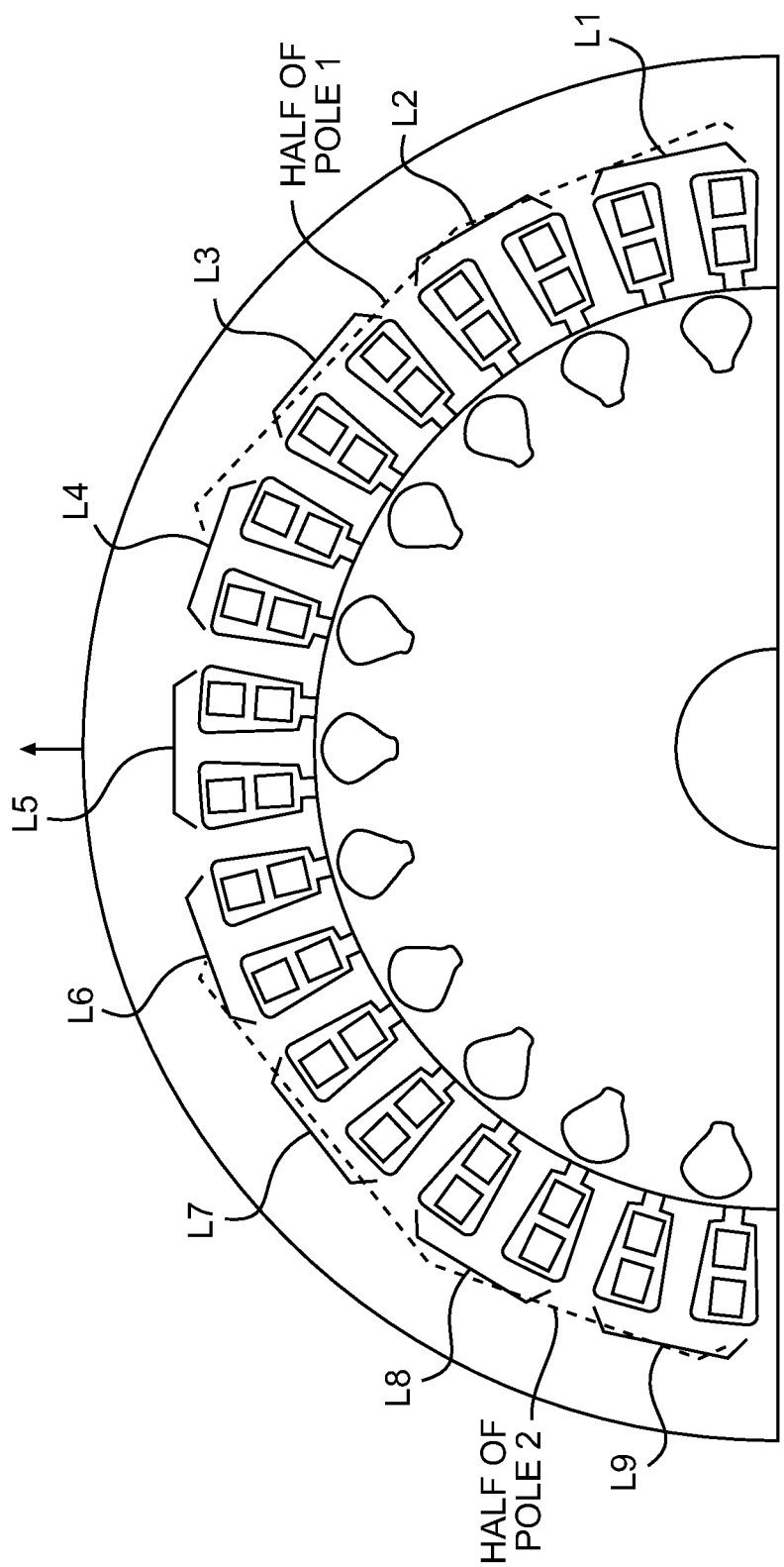
FIG. 2 is a diagrammatic illustration of the configurable windings associated with a nine phase, span 2 electrical induction motor driven by a first, fundamental harmonic waveform.

FIG. 2 provides a diagrammatic illustration of the configurable windings associated with the nine phase, span 2 induction motor when the motor is driven by the first, fundamental harmonic of the drive waveform generated by the inverter. The illustrated cross section shows only the top half of the stator windings, with the bottom half (not shown) being a mirror image of the top half. As shown in FIG. 2, the result of driving the motor with the first harmonic of the drive waveform generated by the inverter is the generation of two magnetic poles. The low number of magnetic poles results in each of the windings seeing a higher voltage than would be the case for more poles, and therefore the speed of rotation of the motor increases while the torque output decreases (voltage across the windings is proportional to the speed of rotation of the motor, while torque is proportional to the number of poles).

Figure 3:
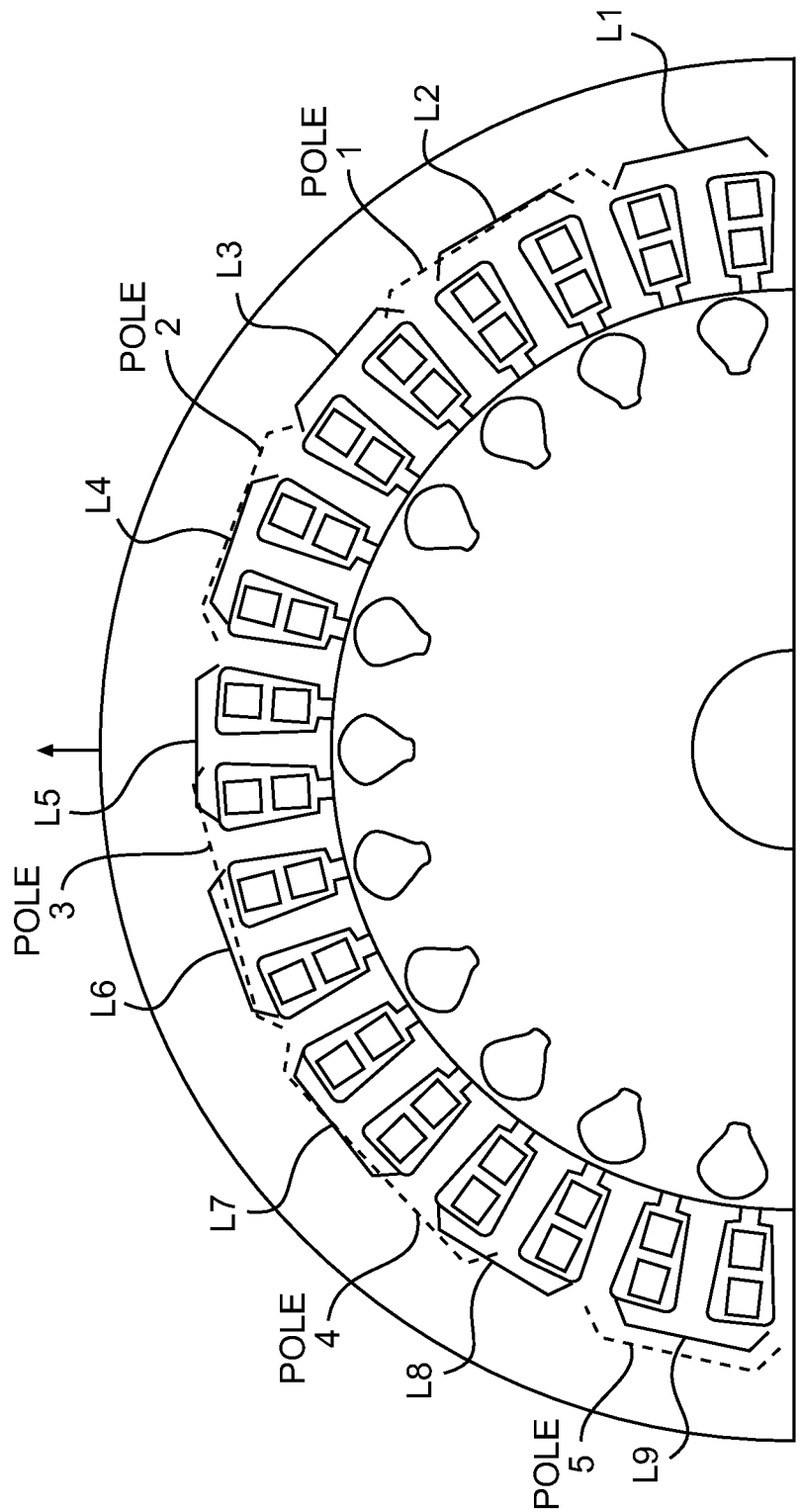
FIG. 3 is a diagrammatic illustration of the configurable windings associated with a nine phase, span 2 electrical induction motor driven by a fifth harmonic waveform.

In one exemplary implementation, a nine phase, mesh connected, span 2 induction motor driven by the first harmonic of the nine phase inverter drive waveform may receive an inverter current of approximately 43 amps and an inverter voltage of approximately 33.9 volts. The voltages across each of the windings would be approximately 43.6 volts, and the current flowing through each of the windings would be approximately 33.5 amps. If the same motor is then driven by the fifth harmonic of the nine phase inverter drive waveform, the number of magnetic poles generated by the flow of current through the windings increases by a factor of five to 10 poles. The cross sectional view of FIG. 3 shows the top half of the stator and half of the 10 poles. The inverter current for the fifth harmonic would increase to approximately 720 amps, with the current flowing through each of the windings being approximately 1020 amps. The inverter voltage for the fifth harmonic would be approximately 26.8 volts, while the voltage across each of the windings would be approximately 18 volts. Increasing the number of magnetic poles as a result of switching from the first harmonic of the nine phase inverter drive waveform to the fifth harmonic increases the amount of current flowing through each winding (from approximately 33.5 amps to approximately 1020 amps). The motor is able to generate significantly more torque at the higher winding current, albeit at lower rotational speeds (approximately 100 RPM). In the exemplary implementation discussed above, the average torque generated by a nine phase, mesh connected, 2 span motor driven at the first harmonic of the drive waveform may be approximately −7.62 Newton-Meters, while the average torque generated by the same motor at the fifth harmonic may be approximately 559 Newton-Meters. The speed of rotation of the motor may drop from approximately 15,000 RPM for the nine phase, mesh connected, span 2 induction motor with two magnetic poles (driven by the first harmonic) to approximately 100 RPM with the 10 poles (driven by the fifth harmonic).

The impedance of the circuits shown schematically in FIGS. 1 and 4 changes as the mechanical load and rotational velocity of the electrical induction motor changes. Impedance is a measure of the opposition that the circuit presents to a current as a voltage is applied. Changes to the harmonics of the drive waveform applied to the circuits changes the impedance as a result of the above-discussed changes to the number of poles generated at each of the different harmonics. The amount of torque (load) that the motor can produce is proportional to the amount of current flowing through each of the windings and proportional to the number of magnetic poles. The rotational velocity of the motor is proportional to the voltage provided across each of the windings. Therefore, the mesh configuration of FIG. 1 for a nine phase, span 2, induction motor driven at a fifth harmonic of the inverter drive waveform may be implemented when low speed rotation of the motor and high output of torque is desired, such as when starting the machine.

When the motor is used in an alternating or generating mode the motor may be operated at higher speeds than when in starting mode, and at a lower torque output, while still producing the same or substantially the same power output. As discussed above, in one exemplary implementation the rotating speeds may increase from approximately 100 RPM during starting to 15,000 RPM when in alternating mode. To achieve the preferred configuration for the high speed, low torque requirements in an alternating mode of operation, the nine phase, mesh connected, span 2 induction motor may be configured to selectively receive the first, fundamental harmonic of the drive waveform generated by the nine phase inverter. The number of magnetic poles generated by the flow of current through the windings may be reduced from ten poles when the fifth harmonic of the drive waveform is applied to the windings, as shown in FIG. 3, to two poles when the first, fundamental harmonic is applied, as shown in FIG. 2. This reduction in the number of poles results in a higher voltage being provided to each of the windings without a significant increase in the total inverter voltage. In the exemplary implementation discussed above, the inverter voltage may increase from approximately 26.8 volts to approximately 33.9 volts when switching from the fifth harmonic to the first harmonic (a 26.5% increase), while the voltage across each of the individual windings may increase from approximately 18 volts to approximately 43.6 volts (a 142% increase). If the harmonic of the drive waveform (and the number of poles) were kept the same when increasing the speed of the motor from 100 RPM to 15,000 RPM, the result would be a significant increase in the inverter voltage.

In the case of a nine phase, span 2 induction motor, increasing the speed of rotation of the motor from 100 RPM to 15,000 RPM without a corresponding decrease in the harmonic of the drive waveform and decrease in the number of poles could result in an increase in a DC voltage at the inverter to several hundred volts. This increase may also result in safety regulations requiring an operator of the machine to qualify for high voltage operation. However, the decrease in the number of poles when switching from a higher harmonic (e.g., fifth harmonic) to a lower harmonic (e.g., first harmonic) in accordance with various implementations of this disclosure, enables higher speed, lower torque operation without a significant increase in the inverter voltage (e.g., the 26.5% increase discussed above). The reduction in the number of poles may also result in a significant decrease in the amount of current flowing through each of the windings. As discussed above with regard to the exemplary implementation for a nine phase, mesh connected, span 2 induction motor, the current flowing through the windings when the motor is driven by the fifth harmonic of the drive waveform may be approximately 1020 amps. This current may drop to approximately 33.5 amps when the motor is driven by the first harmonic of the drive waveform and the speed of rotation is increased to 15,000 RPM. This may improve the efficiency of the motor as a result of the concurrent reduction in resistive losses that occur at higher current flows in accordance with Ohm's Law: $P=I^2R$.

A nine phase inverter (not shown) connected to the induction motor at each of nine terminals may be capable of supplying alternating current of variable voltage and variable frequency to the motor. The inverter may also be used with the induction motor when the induction motor is functioning as an alternating current generator. The inverter may embody a single microprocessor or multiple microprocessors, along with hardware including other electronic components such as insulated gate bipolar transistors (IGBT) and comparators that may be included in pulse-width modulation circuits, firmware, and software, or various combinations of all of the above. Various other known circuits may be associated with the inverter, including power supply circuitry, signal-conditioning circuitry, solenoid driver circuitry, communication circuitry, and other appropriate circuitry.

Figure 5:
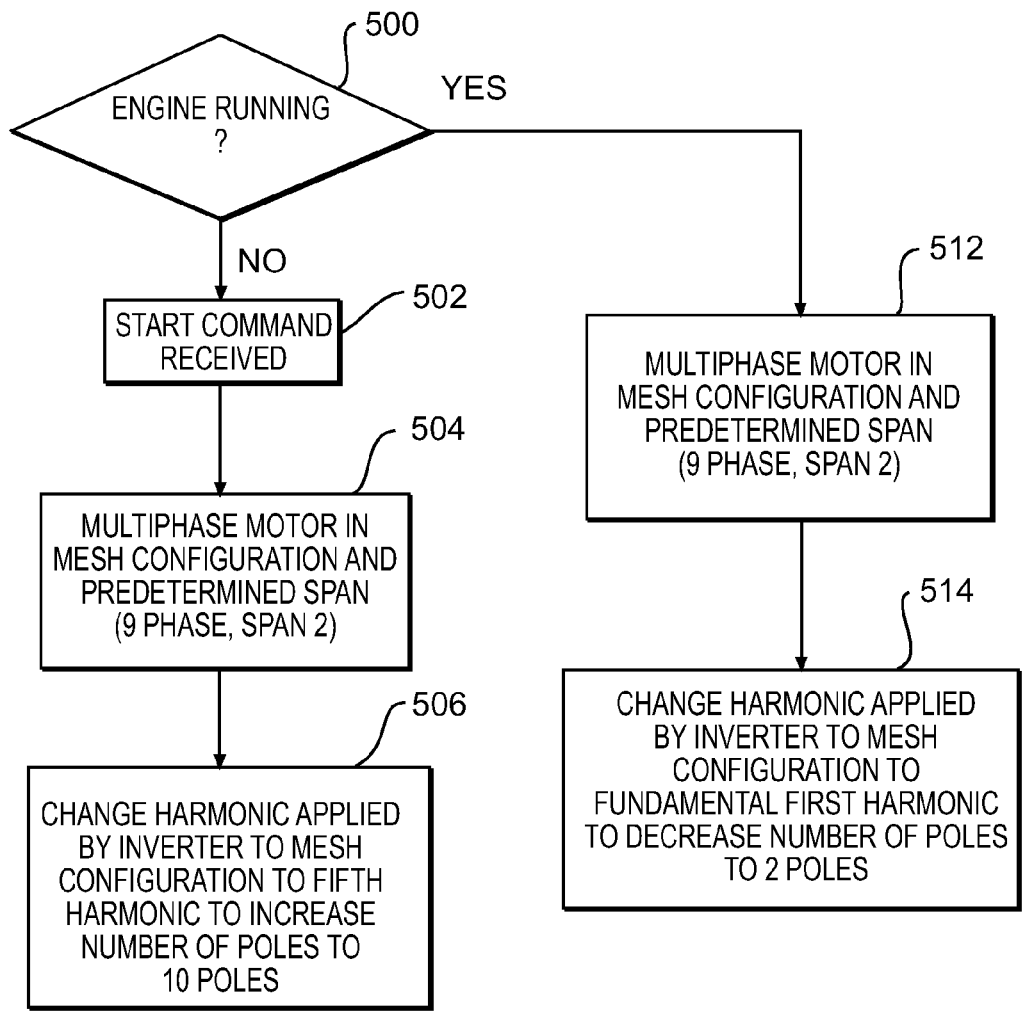
FIG. 5 is a flowchart illustrating an exemplary method of configuring a nine phase, span 2 electrical induction motor.

The flow chart shown in FIG. 5 illustrates an exemplary method of configuring the induction motor shown in FIGS. 1-3, and FIG. 5 will be described in detail in the following section.

INDUSTRIAL APPLICABILITY

The disclosed nine phase, span 2 induction motor with configurable windings may be used as both a starter and as an alternator or generator of electrical power. Induction motors with fewer or more phases than the nine phase induction motor may also be used in accordance with the principles set forth in this disclosure. When used as a starter, the induction motor is required to produce sufficient torque for starting the engine of the machine on which it is mounted. The amount of torque that the induction motor can produce may be proportional to the amount of current flowing through each of the windings on the stator. Torque produced may also be proportional to the number of magnetic poles generated by the current flowing through the windings of the motor. In one exemplary implementation, a nine phase inverter connected to a nine phase induction motor may be configured to receive one or more signals indicative of a request to operate the motor to start an engine. The inverter may then process these signals and send corresponding signals to the nine terminals of the nine phase induction motor. The induction motor may be configured to receive the one or more signals from the inverter and process the one or more signals in order to selectively open or close each of the plurality of contactors to establish one of a mesh configuration or a star configuration.

The induction motor may be further configured to receive the one or more signals from the inverter indicative of a request to operate the motor to start an engine, and process the one of more signals in order to selectively receive the fifth harmonic of the drive waveform generated by the nine phase inverter.

The induction motor according to various implementations of this disclosure may also be used as an alternator for generating electrical power. During the alternating mode of operation the induction motor may be able to handle higher rotational speeds (e.g., 15,000 RPM) than when starting the engine (e.g., 100 RPM), but at the same time producing less torque than when starting the engine. A tradeoff between higher current and lower voltage at each of the windings during starting mode and higher voltage and lower current at each of the windings during alternating mode results in the total power consumed or produced by the motor remaining approximately the same.

The voltage across each of the windings is proportional to the rotational speed of the motor. Therefore higher rotational speeds translate to higher voltages across each of the windings. A reduction in the number of magnetic poles of the motor (e.g., from 10 poles to 2 poles) results in a larger voltage across each of the windings without an increase in the total voltage seen across each pair of terminals connected to an inverter. In the same exemplary implementation discussed above with regard to using the induction motor in a starting mode, the nine phase inverter connected to the induction motor may also be configured to receive one or more signals indicative of a request to operate the motor as an alternator to generate electricity. The inverter may then process these signals and send corresponding signals to the nine terminals of the nine phase induction motor. The induction motor may be configured to receive the one or more signals from the inverter and process the one or more signals in order to selectively open or close each of the plurality of contactors to establish one of the mesh configuration or the star configuration.

The induction motor may be further configured to receive the one or more signals from the inverter indicative of a request to operate the motor as an alternator to generate electricity, and process the one of more signals in order to selectively receive the first, fundamental harmonic of the drive waveform generated by the nine phase inverter.

FIG. 5 illustrates an exemplary method of configuring the induction motor shown in FIGS. 1-3. A first step is to determine whether the engine is running (Step: 500). If the engine is not running (Step: 500=No), then when a start command is received (Step: 502), the induction motor may be switched into a mesh configuration with a predetermined span value (e.g., 9 phase, span 2) as shown in FIG. 1, by changing the circuit path by which current flows through the windings of the motor (Step: 504).

In addition to switching the induction motor to the mesh configuration shown in FIG. 1, the harmonic of the drive waveform applied by the inverter to the mesh configuration may be changed to the fifth harmonic in order to increase the number of magnetic poles to 10 poles (Step: 506). As discussed above, the increased number of poles translates to a higher torque and lower rotational speed, which is appropriate for the starting mode of operation.

If the engine is running (Step: 500=Yes), the induction motor may be switched into a mesh configuration with a predetermined span value (e.g., 9 phase, span 2) by changing the circuit path by which current flows through the windings of the motor (Step: 512). Although the exemplary implementation shown in FIG. 5 includes switching the circuit path of the induction motor to a mesh configuration, alternative implementations may also include switching the circuit to a star connected configuration.

In addition to switching the induction motor to the mesh configuration, such as shown in FIG. 1, the harmonic of the drive waveform applied by the inverter to the mesh configuration may be changed to the fundamental first harmonic in order to decrease the number of magnetic poles to two poles (Step: 514). The decreased number of poles may allow for much higher rotational speeds at lower torque output with reduced resistive losses as a result of the lower amount of current flowing through the windings.

It will be apparent to those skilled in the art that various modifications and variations can be made to the induction motor of the present disclosure. Other embodiments of the induction motor and methods of configuring the induction motor will be apparent to those skilled in the art after consideration of the specification and practice of the methods disclosed herein. It is intended that the specification and examples be considered as exemplary only, with a true scope of the disclosure being indicated by the following claims and their equivalents.

What is claimed is:

1. An electrical induction motor, comprising:
   nine separate terminals configured to receive nine separate current inputs from nine output phases of a nine phase inverter;
   nine windings connected to the nine separate terminals;
   a plurality of contactors, each of the plurality of contactors being configured to be selectively opened or closed in a circuit including the nine windings to selectively connect the nine windings together in one of a mesh configuration or a star configuration;
   each of the nine windings being configured to be selectively connected between two of the nine separate current inputs, with a phase angle difference between the two separate current inputs of 40 degrees;
   each of the plurality of contactors being further configured to be selectively opened or closed to establish a span value for the mesh configuration of two, with two being the number of inverter output phases between a terminal of one of the nine windings and a terminal of another of the nine windings connected to the one of the nine windings; and
   the motor being further configured to selectively receive a first one of the harmonics of a drive waveform generated by the nine phase inverter and a second, different one of the harmonics of the drive waveform generated by the nine phase inverter.

2. The electrical induction motor of claim 1, wherein each of the nine windings comprises at least a resistance and an inductance.

3. The electrical induction motor of claim 1, further configured to receive one or more signals indicative of a request to operate the motor to start an engine, and configured to process the one or more signals in order to selectively open or close each of the plurality of contactors to establish one of the mesh configuration with a span value of two or the star configuration.

4. The electrical induction motor of claim 1, further configured to receive one or more signals indicative of a request to operate the motor to start an engine, and configured to process the one of more signals in order to selectively receive the fifth harmonic of the drive waveform generated by the nine phase inverter.

5. The electrical induction motor of claim 4, wherein the fifth harmonic of the drive waveform selectively received from the nine phase inverter results in the generation of ten magnetic poles.

6. The electrical induction motor of claim 5, wherein an amount of current flowing through each of the nine windings is greater than an amount of current received at each of the nine separate terminals from the nine phase inverter, and a voltage across each of the nine windings is less than a voltage provided to the motor by the nine phase inverter.

7. The electrical induction motor of claim 1, further configured to receive one or more signals indicative of a request to operate the motor as an alternator to generate electricity, and configured to process the one or more signals in order to selectively open or close each of the plurality of contactors to establish one of the mesh configuration with a span value of two or the star configuration.

8. The electrical induction motor of claim 1, further configured to receive one or more signals indicative of a request to operate the motor as an alternator to generate electricity, and configured to process the one of more signals in order to selectively receive the first, fundamental harmonic of the drive waveform generated by the nine phase inverter.

9. The electrical induction motor of claim 8, wherein the first, fundamental harmonic of the drive waveform received from the nine phase inverter results in the generation of two magnetic poles.

10. The electrical induction motor of claim 9, wherein an amount of current flowing through each of the nine windings is less than an amount of current received at each of the nine separate terminals from the nine phase inverter, and a voltage across each of the nine windings is greater than a voltage provided to the motor by the nine phase inverter.

11. A method for configuring a nine phase electrical induction motor including nine windings and a plurality of contactors arranged in a circuit including the nine windings, the method comprising:
    selectively opening or closing each of the plurality of contactors to selectively connect the nine windings together in one of a mesh configuration or a star configuration;
    selectively connecting each of the nine windings between two of nine separate current inputs from nine output phases of a nine phase inverter, with a phase angle difference between the two separate current inputs of 40 degrees;
    selectively opening or closing each of the plurality of contactors to result in a span value for the mesh configuration of two, with two being the number of inverter output phases between a terminal of one of the nine windings and a terminal of another of the nine windings connected to the one of the nine windings; and
    selectively receiving a first one of the harmonics of a drive waveform generated by the nine phase inverter and a second, different one of the harmonics of the drive waveform generated by the nine phase inverter.

12. The method of claim 11, further including:
    receiving one or more signals indicative of a request to operate the motor to start an engine; and
    processing the one or more signals in order to selectively open or close each of the plurality of contactors to establish one of the mesh configuration with a span value of two or the star configuration.

13. The method of claim 11, further including:
    receiving one or more signals indicative of a request to operate the motor to start an engine; and processing the one of more signals in order to selectively receive the fifth harmonic of the drive waveform generated by the nine phase inverter.

14. The method of claim 13, wherein the fifth harmonic of the drive waveform results in the generation of ten magnetic poles.

15. The method of claim 11, further including:
receiving one or more signals indicative of a request to operate the motor as an alternator to generate electricity; and
processing the one or more signals in order to selectively open or close each of the plurality of contactors to establish one of the mesh configuration with a span value of two or the star configuration.

16. The method of claim 11, further including:
receiving one or more signals indicative of a request to operate the motor as an alternator to generate electricity; and
processing the one or more signals in order to selectively receive the first, fundamental harmonic of the drive waveform generated by the nine phase inverter.

17. The method of claim 16, wherein the first, fundamental harmonic of the drive waveform results in the generation of 2 magnetic poles.

18. An electrical system for a machine, the electrical system comprising:
a nine phase inverter; and
a nine phase induction motor configured to receive nine separate current inputs at nine separate terminals from nine output phases of the nine phase inverter, the nine phase induction motor further including:
nine windings connected to the nine separate terminals; and
a plurality of contactors, each of the plurality of contactors being configured to be selectively opened or closed in a circuit including the nine windings to selectively connect the nine windings together in one of a mesh configuration or a star configuration;
each of the nine windings being configured to be selectively connected between two of the nine separate current inputs, with a phase angle difference between the two separate current inputs of 40 degrees;
each of the plurality of contactors being further configured to be selectively opened or closed to establish a span value for the mesh configuration of two, with two being the number of inverter output phases between a terminal of one of the nine windings and a terminal of another of the nine windings connected to the one of the nine windings; and
the motor being further configured to selectively receive a first one of the harmonics of a drive waveform generated by the nine phase inverter and a second, different one of the harmonics of the drive waveform generated by the nine phase inverter.

19. The electrical system of claim 18, wherein the nine phase induction motor is further configured to:
receive one or more signals indicative of a request to operate the motor to start an engine;
process the one or more signals in order to selectively open or close each of the plurality of contactors to establish one of the mesh configuration with a span value of two or the star configuration; and
process the one of more signals in order to selectively receive the fifth harmonic of the drive waveform generated by the nine phase inverter.

20. The electrical system of claim 18, wherein the nine phase induction motor is further configured to:
receive one or more signals indicative of a request to operate the motor as an alternator to generate electricity;
process the one or more signals in order to selectively open or close each of the plurality of contactors to establish one of the mesh configuration with a span value of two or the star configuration; and
process the one of more signals in order to selectively receive the first, fundamental harmonic of the drive waveform generated by the nine phase inverter.

* * * * *